(12) United States Patent
Love et al.

(10) Patent No.: US 11,708,469 B2
(45) Date of Patent: Jul. 25, 2023

(54) COMPOSITE FILM AND METHODS OF FORMING A COMPOSITE FILM

(71) Applicant: SAINT-GOBAIN PERFORMANCE PLASTICS CORPORATION, Solon, OH (US)

(72) Inventors: Nicole Love, Somerville, MA (US); Sethumadhavan Ravichandran, Shrewsbury, MA (US); Steven R. Dubrule, Holden, MA (US); Corey Laven, Medway, MA (US)

(73) Assignee: SAINT-GOBAIN PERFORMANCE PLASTICS CORPORATION, Solon, OH (US)

(*) Notice: Subject to any disclaimer, the term of this patent is extended or adjusted under 35 U.S.C. 154(b) by 0 days.

(21) Appl. No.: 17/457,469

(22) Filed: Dec. 3, 2021

(65) Prior Publication Data
US 2022/0177658 A1 Jun. 9, 2022

Related U.S. Application Data

(60) Provisional application No. 63/122,264, filed on Dec. 7, 2020.

(51) Int. Cl.
*C08J 5/18* (2006.01)
*C08F 222/10* (2006.01)
*C08J 7/04* (2020.01)

(52) U.S. Cl.
CPC ............ *C08J 5/18* (2013.01); *C08F 222/1065* (2020.02); *C08J 7/0427* (2020.01)

(58) Field of Classification Search
CPC ............ C08F 222/1065; C08J 2367/02; C08J 2433/14; C08J 5/18; C08J 7/0427; C09D 133/14
See application file for complete search history.

(56) References Cited

U.S. PATENT DOCUMENTS

| | | |
|---|---|---|
| 4,643,944 A | 2/1987 | Agethen et al. |
| 5,082,515 A | 1/1992 | Cartier et al. |
| 6,998,425 B2 | 2/2006 | Chisholm et al. |

(Continued)

FOREIGN PATENT DOCUMENTS

| | | |
|---|---|---|
| CA | 2200216 A1 | 4/1996 |
| CN | 102153856 A | 8/2011 |

(Continued)

OTHER PUBLICATIONS

International Search Report and Written Opinion for PCT Application No. PCT/US2021/072720, dated Apr. 5, 2022, 9 pages.

*Primary Examiner* — Lawrence D Ferguson
(74) *Attorney, Agent, or Firm* — Abel Schillinger, LLP; Chi Suk Kim

(57) ABSTRACT

According to one aspect, a composite film may include a substrate, and a protection coating overlying the substrate. The protection coating may include a urethane acrylate 6-functional oligomer, and a urethane acrylate 2-functional oligomer. The protection coating may further include a urethane acrylate oligomer ratio $UAC_6/UAC_2$ of at least about 0.5 and not greater than about 3, where $UAC_6$ is equal to the content of the urethane acrylate 6-functional oligomer in wt. % for a total weight of the protection coating and $UAC_2$ is equal to the content of the urethane acrylate 2-functional oligomer in wt. % for a total dry weight of the protection coating.

18 Claims, 4 Drawing Sheets

(56) References Cited

U.S. PATENT DOCUMENTS

| | | |
|---|---|---|
| 9,023,934 B2 | 5/2015 | Jang et al. |
| 9,146,506 B2 | 9/2015 | Yoshizawa et al. |
| 9,884,977 B2 | 2/2018 | Kang et al. |
| 9,902,868 B2 | 2/2018 | Kang et al. |
| 9,909,026 B2 | 3/2018 | Kang et al. |
| 10,087,340 B2 | 10/2018 | Kang et al. |
| 10,400,110 B2 | 9/2019 | Kim et al. |
| 2010/0035026 A1 | 2/2010 | Oscar et al. |
| 2010/0266784 A1 | 10/2010 | Urban et al. |
| 2011/0183120 A1 | 7/2011 | Sharygin et al. |
| 2011/0251335 A1 | 10/2011 | Elizalde et al. |
| 2011/0293958 A1 | 12/2011 | Benkoski et al. |
| 2013/0196071 A1 | 8/2013 | Yang et al. |
| 2014/0134426 A1 | 5/2014 | Henry |
| 2018/0201802 A1 | 7/2018 | Sakuramoto et al. |
| 2018/0237604 A1 | 8/2018 | Cho et al. |
| 2018/0327631 A1 | 11/2018 | Urban et al. |
| 2018/0345639 A1 | 12/2018 | Kamada et al. |
| 2019/0022990 A1 | 1/2019 | Wu et al. |

FOREIGN PATENT DOCUMENTS

| | | |
|---|---|---|
| CN | 102390147 A | 3/2012 |
| CN | 102746779 A | 10/2012 |
| CN | 102963060 A | 3/2013 |
| CN | 104087141 A | 10/2014 |
| CN | 205395333 U | 7/2016 |
| CN | 205439450 U | 8/2016 |
| CN | 106519180 A | 3/2017 |
| CN | 106626568 A | 5/2017 |
| CN | 106800878 A | 6/2017 |
| CN | 106867388 A | 6/2017 |
| CN | 107082862 A | 8/2017 |
| CN | 107187084 A | 9/2017 |
| CN | 107253357 A | 10/2017 |
| CN | 107323055 A | 11/2017 |
| CN | 107629657 A | 1/2018 |
| CN | 207241077 U | 4/2018 |
| CN | 207274077 U | 4/2018 |
| CN | 207291143 U | 5/2018 |
| CN | 108116020 A | 6/2018 |
| CN | 108129967 A | 6/2018 |
| CN | 108300353 A | 7/2018 |
| CN | 207643829 U | 7/2018 |
| CN | 207749065 U | 8/2018 |
| CN | 108586700 A | 9/2018 |
| CN | 108659698 A | 10/2018 |
| CN | 108676482 A | 10/2018 |
| CN | 108752563 A | 11/2018 |
| CN | 108819414 A | 11/2018 |
| CN | 108864403 A | 11/2018 |
| CN | 108912657 A | 11/2018 |
| CN | 109134817 A | 1/2019 |
| CN | 109233669 A | 1/2019 |
| CN | 208438835 U | 1/2019 |
| CN | 109749608 A | 5/2019 |
| CN | 110218525 A | 9/2019 |
| CN | 110305293 A | 10/2019 |
| CN | 110343475 A | 10/2019 |
| CN | 209508128 U | 10/2019 |
| CN | 110498942 A | 11/2019 |
| CN | 110616049 A | 12/2019 |
| CN | 110819246 A | 2/2020 |
| CN | 210012790 U | 2/2020 |
| CN | 210062299 U | 2/2020 |
| DE | 3205055 | 8/1983 |
| DE | 102008054974 A1 | 7/2009 |
| EP | 54491 A1 | 6/1982 |
| EP | 0190517 A1 | 8/1986 |
| EP | 2426158 A1 | 3/2012 |
| EP | 2644668 A2 | 10/2013 |
| EP | 3235842 A1 | 10/2017 |
| EP | 3235843 A1 | 10/2017 |
| EP | 3279282 A1 | 2/2018 |
| EP | 3298056 A1 | 3/2018 |
| EP | 3392243 A1 | 10/2018 |
| FR | 2548674 A1 | 1/1985 |
| FR | 2574395 A1 | 6/1986 |
| FR | 2577935 A1 | 8/1986 |
| JP | S61179733 A | 8/1986 |
| JP | 1994180628 A | 6/1994 |
| JP | 4380396 B2 | 12/2009 |
| JP | 4735003 B2 | 7/2011 |
| JP | 2013144391 A | 7/2013 |
| JP | 2013213207 A | 10/2013 |
| JP | 2016141753 A | 8/2016 |
| JP | 2017177742 A | 10/2017 |
| JP | 2018167574 A | 11/2018 |
| JP | 2019167489 A | 10/2019 |
| KR | 20100135089 A | 12/2010 |
| KR | 101347245 B1 | 1/2014 |
| KR | 101372758 B1 | 3/2014 |
| KR | 101461322 B1 | 11/2014 |
| KR | 20160065754 A | 6/2016 |
| KR | 20170084396 A | 7/2017 |
| KR | 101767453 B1 | 8/2017 |
| KR | 20190000014 A | 1/2019 |
| KR | 102000568 B1 | 7/2019 |
| KR | 20190083551 A | 7/2019 |
| KR | 20200054670 A | 5/2020 |
| WO | 2015067833 A1 | 5/2015 |
| WO | 2017094480 A1 | 6/2017 |
| WO | 2017188728 A1 | 11/2017 |
| WO | 2018128073 A1 | 7/2018 |

COMPOSITE FILM AND METHODS OF FORMING A COMPOSITE FILM

CROSS-REFERENCE TO RELATED APPLICATION(S)

This application claims priority under 35 U.S.C. § 119(e) to U.S. Provisional Patent Application No. 63/122,264, entitled "COMPOSITE FILM AND METHODS OF FORMING A COMPOSITE FILM," by Nicole LOVE et al., filed Dec. 7, 2020, which is assigned to the current assignee hereof and is incorporated herein by reference in its entirety.

FIELD OF THE DISCLOSURE

The present disclosure relates to a composite film. In particular, the present disclosure relates to a composite film with a protective coating.

BACKGROUND

Composite films can be used as coverings applied to automotive components (i.e., front bumper, hood, etc.), buildings or other structures to improve strength and protection benefits. Such composite films generally include a substrate and a protective coating overlying the substrate. The chemistry, thickness and other properties of the protective coating often determine the performance of the composite film. As such, a need exists for composite films with protective coatings that show improvements in transparency, self-healing, stain resistance, chemical resistance, abrasion resistance, high water contact angle and elongation.

SUMMARY

According to one aspect, a composite film may include a substrate, and a protection coating overlying the substrate. The protection coating may include a urethane acrylate 6-functional oligomer, and a urethane acrylate 2-functional oligomer. The protection coating may further include a urethane acrylate oligomer ratio $UAC_6/UAC_2$ of at least about 0.5 and not greater than about 3, where $UAC_6$ is equal to the content of the urethane acrylate 6-functional oligomer in wt. % for a total weight of the protection coating and $UAC_2$ is equal to the content of the urethane acrylate 2-functional oligomer in wt. % for a total dry weight of the protection coating.

According to yet another aspect, a composite film may include a substrate, and a protection coating overlying a first surface of the substrate. The protection coating may include a urethane acrylate 6-functional oligomer at a content of at least about 10 wt. % and not greater than about 75 wt. % for a total dry-weight of the protection coating. The protection coating may further include a urethane acrylate 2-functional oligomer at a content of at least about 5 wt. % and not greater than about 50 wt. % for a total dry-weight of the protection coating.

According to still another aspect, a composite film may include a substrate, and a protection coating overlying a first surface of the substrate. The protection coating may include a urethane acrylate 6-functional oligomer, and a urethane acrylate 2-functional oligomer. The protection coating may have a surface energy of at least about 20 mN/m and not greater than about 50 mN/m.

According to yet another aspect, a composite film may include a substrate, and a protection coating overlying a first surface of the substrate. The protection coating may include a urethane acrylate 6-functional oligomer, and a urethane acrylate 2-functional oligomer. The protection coating may have a $H_2O$ contact angle of at least about 80° and not greater than about 105°.

BRIEF DESCRIPTION OF THE DRAWINGS

Embodiments are illustrated by way of example and are not limited in the accompanying figures.

Figure 1:
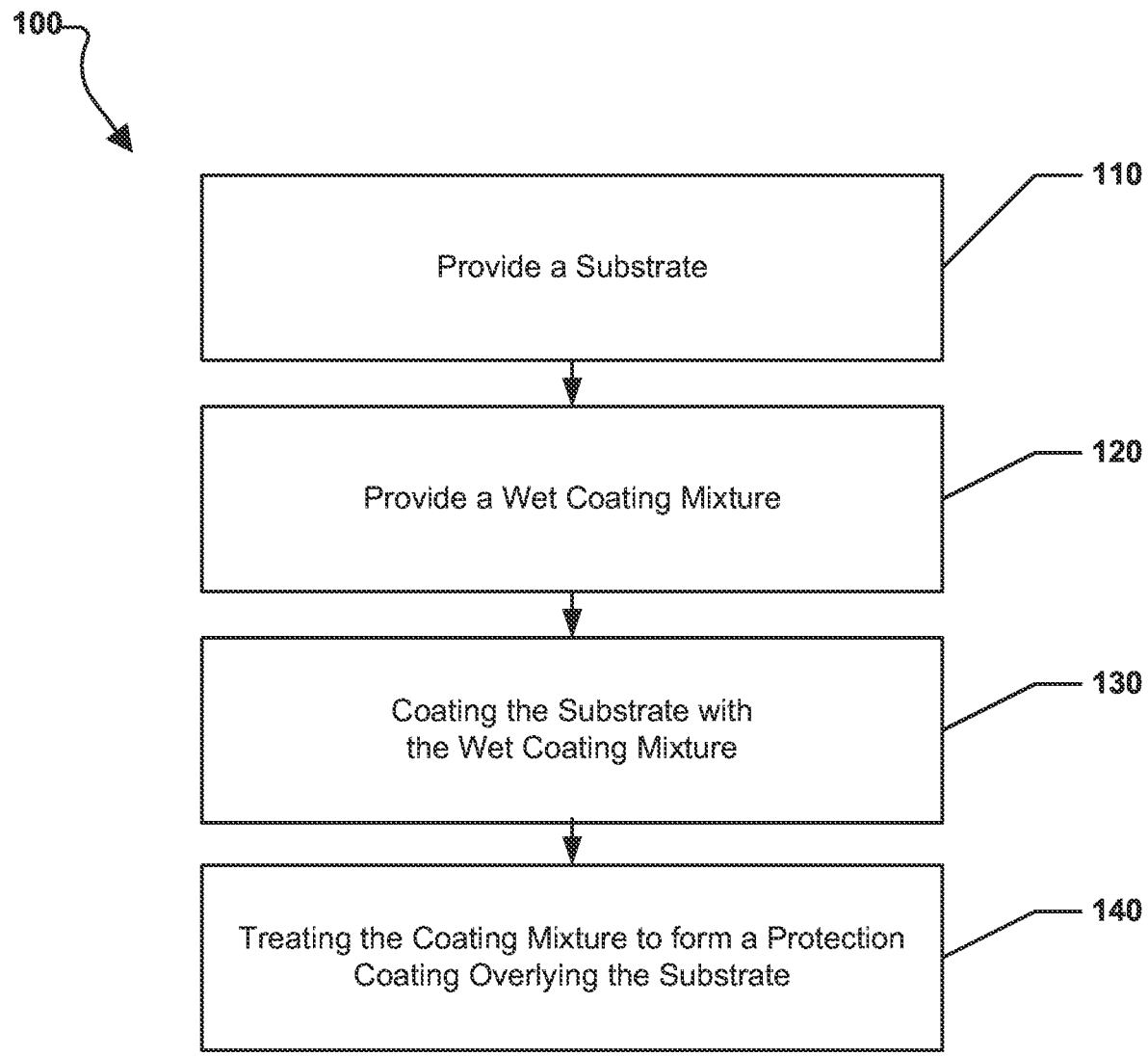
FIG. 1 includes a diagram showing a composite film forming method according to embodiments described herein.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention. Further, the use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the solar control arts.

Embodiments described herein are generally directed to composite film that may include a substrate and a protection coating overlying a first surface of the substrate. According to particular embodiments, the protection coating may include a urethane acrylate 6-functional oligomer, and a urethane acrylate 2-functional oligomer. The protection coating may have particular performance characteristics, such as, a particular surface energy, a particular $H_2O$ contact angle, or a combination of thereof.

These concepts are better understood in view of the embodiments described below that illustrate and do not limit the scope of the present disclosure.

Referring first to a method of forming a composite film, FIG. 1 includes a diagram showing a forming method 100 for forming a composite film according to embodiments described herein. According to particular embodiments, the forming method 100 may include a first step 110 of providing a substrate, a second step 120 of providing a wet coating mixture, a third step 130 of coating the substrate with the wet coating mixture and a fourth step 140 of treating the coating mixture to form a protection coating overlying the substrate.

According to particular embodiments the wet coating mixture may include a urethane acrylate 6-functional oligomer, a urethane acrylate 2-functional oligomer, and a solvent.

According to other embodiments, coating mixture may include a particular urethane acrylate oligomer ratio $UAM_6/UAM_2$, where $UAM_6$ is equal to the content of the urethane acrylate 6-functional oligomer in wt. % for a total wet-weight of the coating mixture and $UAM_2$ is equal to the content of the urethane acrylate 2-functional oligomer in wt. % for a total dry wet-weight of the coating mixture. According to particular embodiments, the coating mixture may have a urethane acrylate oligomer ratio $UAM_6/UAM_2$ of at least about 0.5, such as, at least about 0.6 or at least about 0.7 or at least about 0.8 or at least about 0.9 or at least about 1.0 or at least about 1.1 or at least about 1.2 or even at least about 1.3. According to still other embodiments, the coating mixture may have a urethane acrylate oligomer ratio $UAM_6/UAM_2$ of not greater than about 3, such as, not greater than about 2.9 or not greater than about 2.8 or not greater than about 2.7 or not greater than about 2.6 or not greater than about 2.5 or not greater than about 2.4 or even not greater than about 2.3. It will be appreciated that the coating mixture may have a urethane acrylate oligomer ratio $UAM_6/UAM_2$ within a range between any of minimum and maximum values noted above. It will be further appreciated that the coating mixture may have a urethane acrylate oligomer ratio $UAM_6/UAM_2$ of any value between any of the minimum and maximum values noted above.

According to yet other embodiments, the coating mixture may include a particular content of urethane acrylate 6-functional oligomer. According to particular embodiments, the coating mixture may include a content of urethane acrylate 6-functional oligomer of at least about 10 wt. % for a total wet-weight of the coating mixture, such as, at least about 12 wt. % or at least about 14 wt. % or at least about 16 wt. % or at least about 18 wt. % or at least about 20 wt. % or at least about 22 wt. % or at least about 24 wt. % or at least about 26 wt. % or at least about 28 wt. % or even at least about 30 wt. %. According to still other embodiments, the coating mixture may include a content of urethane acrylate 6-functional oligomer of not greater than about 75 wt. % for a total wet-weight of the coating mixture, such as, not greater than about 73 wt. % or not greater than about 71 wt. % or not greater than about 69 wt. % or not greater than about 67 wt. % or not greater than about 65 wt. % or not greater than about 63 wt. % or not greater than about 61 wt. % or not greater than about 59 wt. % or not greater than about 57 wt. % or even not greater than about 55 wt. %. It will be appreciated that the coating mixture may include a content of urethane acrylate 6-functional oligomer within a range between any of minimum and maximum values noted above. It will be further appreciated that the coating mixture may include a content of urethane acrylate 6-functional oligomer of any value between any of the minimum and maximum values noted above.

According to yet other embodiments, the coating mixture may include a particular content of urethane acrylate 2-functional oligomer. According to particular embodiments, the coating mixture may include a content of urethane acrylate 2-functional oligomer of at least about 5 wt. % for a total wet-weight of the coating mixture, such as, at least about 7 wt. % or at least about 9 wt. % or at least about 11 wt. % or at least about 13 wt. % or at least about 15 wt. % or at least about 17 wt. % or at least about 19 wt. % or at least about 21 wt. % or even at least about 23 wt. %. According to still other embodiments, the coating mixture may include a content of urethane acrylate 2-functional oligomer of not greater than about 50 wt. % for a total wet-weight of the coating mixture, such as, not greater than about 48 wt. % or not greater than about 46 wt. % or not greater than about 44 wt. % or not greater than about 42 wt. % or not greater than about 40 wt. % or not greater than about 38 wt. % or not greater than about 36 wt. % or not greater than about 34 wt. % or not greater than about 32 wt. % or even not greater than about 30 wt. %. It will be appreciated that the coating mixture may include a content of urethane acrylate 2-functional oligomer within a range between any of minimum and maximum values noted above. It will be further appreciated that the coating mixture may include a content of urethane acrylate 2-functional oligomer of any value between any of the minimum and maximum values noted above.

According to still other embodiments, the coating mixture may further include a slip additive. According to particular embodiments, the slip additive may include a fluoro based additive. According to still other embodiments, the slip additive may be a fluoro based additive. According to particular embodiments, the slip additive may include a silicone based additive. According to still other embodiments, the slip additive may be a silicone based additive. According to particular embodiments, the slip additive may include a fluoro urethane acrylate. According to still other embodiments, the slip additive may be a fluoro urethane acrylate. According to particular embodiments, the slip additive may include silicone urethane acrylate. According to still other embodiments, the slip additive may be silicone urethane acrylate.

According to yet other embodiments, the coating mixture may include a particular content of slip additive. For example, the coating mixture may include a slip additive content of at least about 1.0 wt. % for a total wet-weight of the coating mixture, such as, at least about 1.2 wt. % or at least about 1.4 wt. % or at least about 1.6 wt. % or at least about 1.8 wt. % or at least about 2.0 wt. % or at least about 2.2 wt. % or at least about 2.4 wt. % or at least about 2.6 wt. % or at least about 2.8 wt. % or even at least about 3.0 wt.

%. According to still other embodiments, the coating mixture may include a slip additive content of not greater than about 7.0 wt. % for a total wet-weight of the coating mixture, such as, not greater than about 6.8 wt. % or not greater than about 6.6 wt. % or not greater than about 6.4 wt. % or not greater than about 6.2 wt. % or not greater than about 6.0 wt. % or not greater than about 5.8 wt. % or not greater than about 5.6 wt. % or not greater than about 5.4 wt. % or not greater than about 5.2 wt. % or not greater than about 5.0 wt. % or not greater than about 4.8 wt. % or not greater than about 4.6 wt. % or not greater than about 4.4 wt. % or not greater than about 4.2 wt. % or even not greater than about 4.0 wt. %. It will be appreciated that the coating mixture may include a slip additive content within a range between any of minimum and maximum values noted above. It will be further appreciated that the coating mixture may include a slip additive content of any value between any of the minimum and maximum values noted above.

According to still other embodiments, the coating mixture may further include a photoinitiator. According to particular embodiments, the photoinitiator may include a Norish Type 1 photoinitiator. According to particular embodiments, the photoinitiator may be a Norish Type 1 photoinitiator.

According to yet other embodiments, the coating mixture may include a particular content of photoinitiator. For example, the coating mixture may include a photoinitiator content of at least about 1.0 wt. % for a total wet-weight of the coating mixture, such as, at least about 1.2 wt. % or at least about 1.4 wt. % or at least about 1.6 wt. % or at least about 1.8 wt. % or at least about 2.0 wt. % or at least about 2.2 wt. % or at least about 2.4 wt. % or at least about 2.6 wt. % or at least about 2.8 wt. % or even at least about 3.0 wt. %. According to still other embodiments, the coating mixture may include a photoinitiator content of not greater than about 7.0 wt. % for a total wet-weight of the coating mixture, such as, not greater than about 6.8 wt. % or not greater than about 6.6 wt. % or not greater than about 6.4 wt. % or not greater than about 6.2 wt. % or not greater than about 6.0 wt. % or not greater than about 5.8 wt. % or not greater than about 5.6 wt. % or not greater than about 5.4 wt. % or not greater than about 5.2 wt. % or not greater than about 5.0 wt. % or not greater than about 4.8 wt. % or not greater than about 4.6 wt. % or not greater than about 4.4 wt. % or not greater than about 4.2 wt. % or even not greater than about 4.0 wt. %. It will be appreciated that the coating mixture may include a photoinitiator content within a range between any of minimum and maximum values noted above. It will be further appreciated that the coating mixture may include a photoinitiator content of any value between any of the minimum and maximum values noted above.

Figure 2:
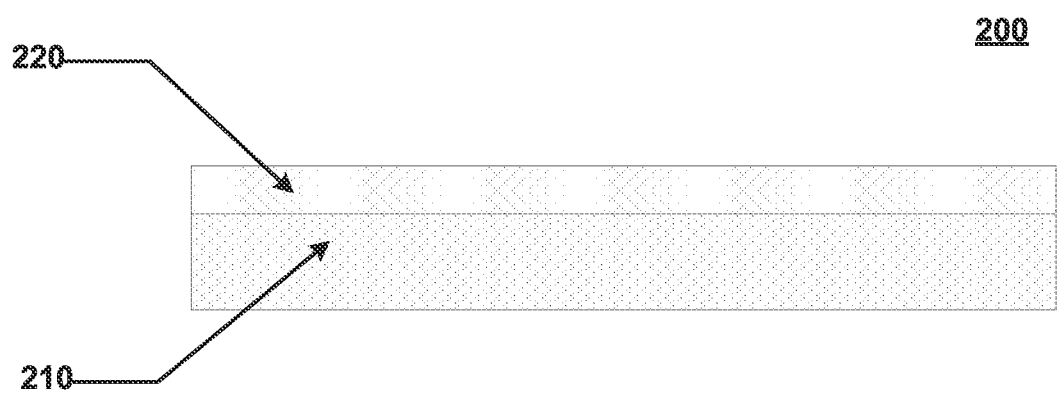
FIG. 2 includes an illustration showing the configuration of a composite film formed according to embodiments described herein.

Referring now to embodiments of a composite film formed according to forming method 100, FIG. 2. includes an illustration of a cross-sectional view of a portion of a composite film 200. As shown in FIG. 2, the composite film 200 may include a substrate 210, and a protection coating 220 overlying a first surface 212 of the substrate 210.

According to particular embodiments, the protection coating 220 may include a urethane acrylate 6-functional oligomer, and a urethane acrylate 2-functional oligomer.

According to still other embodiments, the protection coating 220 may include a particular urethane acrylate oligomer ratio $UAC_6/UAC_2$, where $UAC_6$ is equal to the content of the urethane acrylate 6-functional oligomer in wt. % for a total weight of the protection coating and $UAC_2$ is equal to the content of the urethane acrylate 2-functional oligomer in wt. % for a total dry weight of the protection coating. For purposes of embodiments described herein, the content of any particular urethane acrylate oligomer in the protection coating. According to particular embodiments, the protection coating 220 may have a urethane acrylate oligomer ratio $UAC_6/UAC_2$ of at least about 0.5, such as, at least about 0.6 or at least about 0.7 or at least about 0.8 or at least about 0.9 or at least about 1.0 or at least about 1.1 or at least about 1.2 or even at least about 1.3. According to still other embodiments, the protection coating 220 may have a urethane acrylate oligomer ratio $UAC_6/UAC_2$ of not greater than about 3, such as, not greater than about 2.9 or not greater than about 2.8 or not greater than about 2.7 or not greater than about 2.6 or not greater than about 2.5 or not greater than about 2.4 or even not greater than about 2.3. It will be appreciated that the protection coating 220 may have a urethane acrylate oligomer ratio $UAC_6/UAC_2$ within a range between any of minimum and maximum values noted above. It will be further appreciated that the protection coating 220 may have a urethane acrylate oligomer ratio $UAC_6/UAC_2$ of any value between any of the minimum and maximum values noted above.

According to yet other embodiments, the protection coating 220 may include a particular content of urethane acrylate 6-functional oligomer. According to particular embodiments, the protection coating 220 may include a content of urethane acrylate 6-functional oligomer of at least about 10 wt. % for a total dry-weight of the protection coating, such as, at least about 12 wt. % or at least about 14 wt. % or at least about 16 wt. % or at least about 18 wt. % or at least about 20 wt. % or at least about 22 wt. % or at least about 24 wt. % or at least about 26 wt. % or at least about 28 wt. % or even at least about 30 wt. %. According to still other embodiments, the protection coating 220 may include a content of urethane acrylate 6-functional oligomer of not greater than about 75 wt. % for a total dry-weight of the protection coating, such as, not greater than about 73 wt. % or not greater than about 71 wt. % or not greater than about 69 wt. % or not greater than about 67 wt. % or not greater than about 65 wt. % or not greater than about 63 wt. % or not greater than about 61 wt. % or not greater than about 59 wt. % or not greater than about 57 wt. % or even not greater than about 55 wt. %. It will be appreciated that the protection coating 220 may include a content of urethane acrylate 6-functional oligomer within a range between any of minimum and maximum values noted above. It will be further appreciated that the protection coating 220 may include a content of urethane acrylate 6-functional oligomer of any value between any of the minimum and maximum values noted above.

According to yet other embodiments, the protection coating 220 may include a particular content of urethane acrylate 2-functional oligomer. According to particular embodiments, the protection coating 220 may include a content of urethane acrylate 2-functional oligomer of at least about 5 wt. % for a total dry-weight of the protection coating, such as, at least about 7 wt. % or at least about 9 wt. % or at least about 11 wt. % or at least about 13 wt. % or at least about 15 wt. % or at least about 17 wt. % or at least about 19 wt. % or at least about 21 wt. % or even at least about 23 wt. %. According to still other embodiments, the protection coating 220 may include a content of urethane acrylate 2-functional oligomer of not greater than about 50 wt. % for a total dry-weight of the protection coating, such as, not greater than about 48 wt. % or not greater than about 46 wt. % or not greater than about 44 wt. % or not greater than about 42 wt. % or not greater than about 40 wt. % or not greater than about 38 wt. % or not greater than about 36 wt. % or not greater than about 34 wt. % or not greater than about 32 wt.

% or even not greater than about 30 wt. %. It will be appreciated that the protection coating 220 may include a content of urethane acrylate 2-functional oligomer within a range between any of minimum and maximum values noted above. It will be further appreciated that the protection coating 220 may include a content of urethane acrylate 2-functional oligomer of any value between any of the minimum and maximum values noted above.

According to still other embodiments, the protection coating 220 may have a particular surface energy as measured using a Kruss Mobile Surface Analyzer which deposits and images a droplet of both water and diiodomethane on the surface of the film and measures the contact angle of each. Based on these measurements, the surface energy is calculated according to Owens-Wendt-Rabel-Kaelble, Wu, Zisman, Fowkes and van Oss & Good. For example, the protection coating 220 may have a surface energy of at least about 20 mN/m, such as, at least about 22 mN/m or at least about 24 mN/m or at least about 26 mN/m or at least about 28 mN/m or at least about 30 mN/m or at least about 32 mN/m or at least about 34 mN/m or even at least about 36 mN/m. According to still other embodiments, the protection coating 220 may have a surface energy of not greater than about 50 mN/m, such as, greater than about 48 mN/m or not greater than about 46 mN/m or not greater than about 44 mN/m or not greater than about 42 mN/m or not greater than about 40 mN/m or not greater than about 40 mN/m or even not greater than about 38 mN/m. It will be appreciated that the protection coating 220 may have a surface energy within a range between any of minimum and maximum values noted above. It will be further appreciated that the protection coating 220 may have a surface energy of any value between any of the minimum and maximum values noted above.

According to yet other embodiments, the protection coating 220 may have a particular $H_2O$ contact angle as measured using a Kruss Mobile Surface Analyzer which deposits and images a droplet of both water and diiodomethane on the surface of the film and measures the contact angle of each. For example, the protection coating 220 may have a $H_2O$ contact angle of at least about 80°, such as, at least about 82° or at least about 84° or at least about 86° or at least about 88° or even at least about 90°. According to still other embodiments, the protection coating 220 may have a $H_2O$ contact angle of not greater than about 105°, such as, not greater than about 103° or not greater than about 101° or not greater than about 99° or not greater than about 97° or even not greater than about 95°. It will be appreciated that the protection coating 220 may have a $H_2O$ contact angle within a range between any of minimum and maximum values noted above. It will be further appreciated that the protection coating 220 may have a $H_2O$ contact angle of any value between any of the minimum and maximum values noted above.

According to other embodiments, the protection coating 220 may have a particular elongation as measured according to ASTM #D882. For example, the protection coating 220 may have an elongation of at least about 20%, such as, at least about 25% or at least about 30% or at least about 35% or at least about 40% or at least about 45% or at least about 50% or at least about 75% or at least about 200% or at least about 150% or at least about 200% or at least about 250% or at least about 300% or at least about 350% or even at least about 400%. According to still other embodiments, the protection coating 220 may have an elongation of not greater than about 800%, such as, not greater than about 795 wt. % or not greater than about 790 wt. % or not greater than about 785 wt. % or not greater than about 780 wt. % or not greater than about 775 wt. % or not greater than about 770 wt. % or not greater than about 765 wt. % or not greater than about 760 wt. % or not greater than about 755 wt. % or not greater than about 750 wt. % or not greater than about 725 wt. % or not greater than about 700 wt. % or not greater than about 650 wt. % or not greater than about 600 wt. % or not greater than about 550 wt. % or even not greater than about 500 wt. %. It will be appreciated that the protection coating 220 may have an elongation within a range between any of minimum and maximum values noted above. It will be further appreciated that the protection coating 220 may have an elongation of any value between any of the minimum and maximum values noted above.

According to yet other embodiments, the protection coating 220 may have a particular stain resistance rating. For purposes of embodiments described herein, the stain resistance rating is equal to the $\Delta L^*$ color measurement of the coating taken before and after a sharpie mark is made over the length of the film, allowed to sit for 15 seconds, and then wiped off with an IPA wetted rag. According to particular embodiments, the protection coating 220 may have a stain resistance rating of not greater than about 3, such as, not greater than about 2.5 or even not greater than about 2.0. It will be appreciated that the protection coating 220 may have a stain resistance rating within a range between any of values noted above. It will be further appreciated that the protection coating 220 may have stain resistance rating of any value between any of the values noted above.

According to still other embodiments, the protection coating 220 may have a particular self-healing rating, where the self-healing rating using a scratch test method of mounting the coated film to a white paint panel with soap and water. An image is taken of the film initially, after scratching, and after healing using a dinoscope. The self-healing performance is a qualitative and quantitative determination based on the before and after images to see how many scratches were healed following the test. The film is scratched via a controlled motorized sled setup. The pressure of the coarse steel brush against the sample is controlled via a spring loaded system; a 3.2 lb weight is placed in the bin to maintain a constant pressure. The sled is set to move at 100 mm/s and the scratching is performed twice against the sample in the same direction. After the scratched image is taken, hot water is immediately poured onto the sample, wiped off, and the sample is imaged again. The initial, before, and after images can then be processed using a Python script to count the number of scratches before and after healing to provide a % healed measurement for each sample. According to particular embodiments, the protection coating 220 may have a self-healing rating or at least about 50%, such as, at least about 55% or at least about 60% or at least about 70% or at least about 75% or at least about 80% or at least about 85% or at least about 90% or even at least about 95%. It will be appreciated that the protection coating 220 may have a self-healing rating within a range between any of values noted above. It will be further appreciated that the protection coating 220 may have a self-healing rating of any value between any of the values noted above.

According to still other embodiments, the protection coating 220 may have a particular VLT. For example, the protection coating 220 may have a VLT of at least about 90%, such as, at least about 91% or at least about 92% or at least about 93% or at least about 94% even at least about 95%. According to still another embodiment, the protection coating 220 may have a VLT of not greater than about 99%. It will be appreciated that the protection coating 220 may have a VLT within a range between any of the values noted above. It will be further appreciated that the protection coating 220 have a VLT of any value between any of the values noted above.

According to still other embodiments, the protection coating 220 may further include a slip additive. According to particular embodiments, the slip additive may include a fluoro based additive. According to still other embodiments, the slip additive may be a fluoro based additive. According to particular embodiments, the slip additive may include a silicone based additive. According to still other embodiments, the slip additive may be a silicone based additive. According to particular embodiments, the slip additive may include a fluoro urethane acrylate. According to still other embodiments, the slip additive may be a fluoro urethane acrylate. According to particular embodiments, the slip additive may include silicone urethane acrylate. According to still other embodiments, the slip additive may be silicone urethane acrylate.

According to yet other embodiments, the protection coating 220 may include a particular content of slip additive. For example, the protection coating 220 may include a slip additive content of at least about 1.0 wt. % for a total dry-weight of the protection coating, such as, at least about 1.2 wt. % or at least about 1.4 wt. % or at least about 1.6 wt. % or at least about 1.8 wt. % or at least about 2.0 wt. % or at least about 2.2 wt. % or at least about 2.4 wt. % or at least about 2.6 wt. % or at least about 2.8 wt. % or even at least about 3.0 wt. %. According to still other embodiments, the protection coating 220 may include a slip additive content of not greater than about 7.0 wt. % for a total dry-weight of the protection coating, such as, not greater than about 6.8 wt. % or not greater than about 6.6 wt. % or not greater than about 6.4 wt. % or not greater than about 6.2 wt. % or not greater than about 6.0 wt. % or not greater than about 5.8 wt. % or not greater than about 5.6 wt. % or not greater than about 5.4 wt. % or not greater than about 5.2 wt. % or not greater than about 5.0 wt. % or not greater than about 4.8 wt. % or not greater than about 4.6 wt. % or not greater than about 4.4 wt. % or not greater than about 4.2 wt. % or even not greater than about 4.0 wt. %. It will be appreciated that the protection coating 220 may include a slip additive content within a range between any of minimum and maximum values noted above. It will be further appreciated that the protection coating 220 may include a slip additive content of any value between any of the minimum and maximum values noted above.

According to still other embodiments, the protection coating 220 may further include a photoinitiator. According to particular embodiments, the photoinitiator may include a Norish Type 1 photoinitiator. According to particular embodiments, the photoinitiator may be a Norish Type 1 photoinitiator.

According to yet other embodiments, the protection coating 220 may include a particular content of photoinitiator. For example, the protection coating 220 may include a photoinitiator content of at least about 1.0 wt. % for a total dry-weight of the protection coating, such as, at least about 1.2 wt. % or at least about 1.4 wt. % or at least about 1.6 wt. % or at least about 1.8 wt. % or at least about 2.0 wt. % or at least about 2.2 wt. % or at least about 2.4 wt. % or at least about 2.6 wt. % or at least about 2.8 wt. % or even at least about 3.0 wt. %. According to still other embodiments, the protection coating 220 may include a photoinitiator content of not greater than about 7.0 wt. % for a total dry-weight of the protection coating, such as, not greater than about 6.8 wt. % or not greater than about 6.6 wt. % or not greater than about 6.4 wt. % or not greater than about 6.2 wt. % or not greater than about 6.0 wt. % or not greater than about 5.8 wt. % or not greater than about 5.6 wt. % or not greater than about 5.4 wt. % or not greater than about 5.2 wt. % or not greater than about 5.0 wt. % or not greater than about 4.8 wt. % or not greater than about 4.6 wt. % or not greater than about 4.4 wt. % or not greater than about 4.2 wt. % or even not greater than about 4.0 wt. %. It will be appreciated that the protection coating 220 may include a photoinitiator content within a range between any of minimum and maximum values noted above. It will be further appreciated that the protection coating 220 may include a photoinitiator content of any value between any of the minimum and maximum values noted above.

According to still other embodiments, the protection coating 220 may have a particular thickness as measured using cross-section SEM imaging. For example, the protection coating 220 may have a thickness of at least about 1 such as, at least about 2 µm or at least about 3 µm or at least about 4 µm or at least about 5 µm or at least about 6 µm or at least about 7 µm or at least about 8 µm or at least about 9 µm or at least about 10 µm or at least about 15 µm or at least about 20 µm. According to still other embodiments, the protection coating may have a thickness of not greater than about 40 µm, such as, not greater than about 39 µm or not greater than about 38 µm or not greater than about 37 µm or not greater than about 36 µm or not greater than about 35 µm or not greater than about 34 µm or not greater than about 33 µm or not greater than about 32 µm or not greater than about 31 µm or not greater than about 30 µm or not greater than about 28 µm or not greater than about 26 µm or not greater than about 24 µm or not greater than about 22 µm or even not greater than about 20 µm. It will be appreciated that the protection coating 220 may have a thickness within a range between any of minimum and maximum values noted above. It will be further appreciated that the protection coating 220 may have a thickness of any value between any of the minimum and maximum values noted above.

According to yet other embodiments, the substrate 210 may include a particular material. For example, the substrate 210 may include a thermoplastic polyurethane, a polyurethane substrate, a polyester substrate, a polypropylene substrate, a polyimide substrate, a nylon substrate, a fluoropolymer substrate, a PEN substrate, a PEI substrate, a PEEK substrate, or a PPS substrate. According to still other embodiments, the substrate 210 may be a thermoplastic polyurethane substrate. According to still other embodiments, the substrate 210 may be a polyurethane substrate. According to still other embodiments, the substrate 210 may be a polyester substrate. According to still other embodiments, the substrate 210 may be a polypropylene substrate. According to still other embodiments, the substrate 210 may be a polyimide substrate. According to still other embodiments, the substrate 210 may be a nylon substrate. According to still other embodiments, the substrate 210 may be a fluoropolymer substrate. According to still other embodiments, the substrate 210 may be a PEN substrate. According to still other embodiments, the substrate 210 may be a PEI substrate. According to still other embodiments, the substrate 210 may be a PEEK substrate. According to still other embodiments, the substrate 210 may be a PPS substrate.

According to yet other embodiments, the substrate 210 may have a particular thickness as measured using a hand micrometer. For example, the substrate 210 may have a thickness of at least about 0.5 mils, such as, at least about 0.6 mils or at least about 0.7 mils or at least about 0.8 mils or at least about 0.9 mils or at least about 1.0 mils or at least about 1.1 mils or at least about 1.2 mils or at least about 1.3 mils or at least about 1.4 mils or even at least about 1.5 mils. According to still other embodiments, the substrate 210 may have a thickness of not greater than about 3 mils, such as, not greater than about 2.9 mils or not greater than about 2.8 mils or not greater than about 2.7 mils or not greater than about 2.6 mils or not greater than about 2.5 mils or not greater than about 2.4 mils or not greater than about 2.3 mils or not greater than about 2.2 mils or not greater than about 2.1 mils or even not greater than about 2.0 mils. It will be appreciated that the substrate 210 may have a thickness within a range between any of minimum and maximum values noted above. It will be further appreciated that the substrate 210 may have a thickness of any value between any of the minimum and maximum values noted above.

Figure 3:
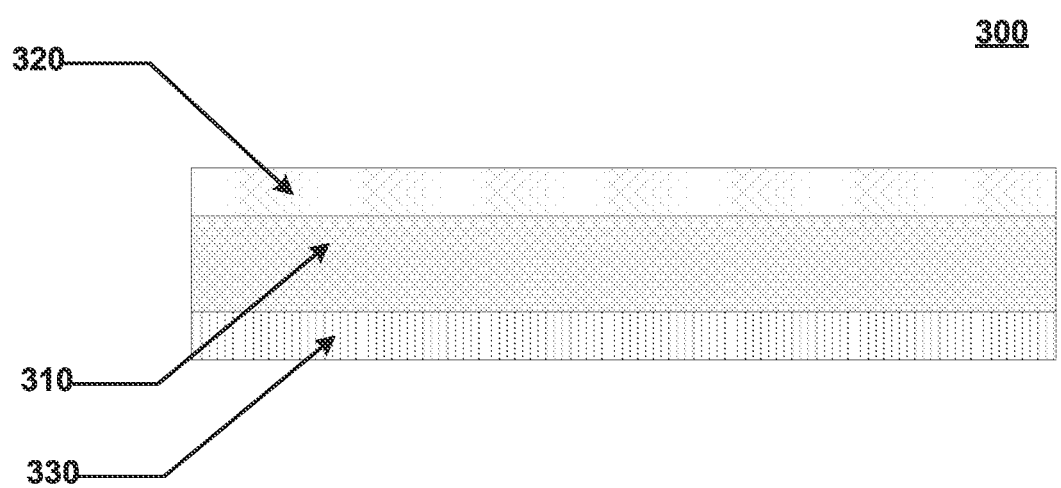
FIG. 3 includes an illustration showing the configuration of a composite film formed according to embodiments described herein.

FIG. 3 includes an illustration of a cross-sectional view of a portion of another example composite film 300. As shown in FIG. 3, the composite film 300 may include a substrate 310, a protection coating 320 overlying a first surface 312 of the substrate 310, and an adhesive layer 330 underlying a second surface 314 of the substrate 310.

It will be appreciated that all description, details and characteristics provided herein in reference to composite film 200 may further apply to or describe corresponding aspects of composite film 300. Specifically, all description, details, and characteristics provided herein in reference to substrate 210 and protection coating 220 may further apply to or describe corresponding aspects of substrate 310 and protection coating 320.

Referring to adhesive layer 330, according to certain embodiments, the adhesive layer 330 may include a particular material. For example, the adhesive layer 330 may include an acrylic adhesive. According the adhesive layer 330 may be an acrylic adhesive layer.

According to yet other embodiments, the adhesive layer 330 may have a particular thickness as measured using a hand micrometer. For example, the adhesive layer 330 may have a thickness of at least about 0.5 mils, such as, at least about 0.6 mils or at least about 0.7 mils or at least about 0.8 mils or at least about 0.9 mils or at least about 1.0 mils or at least about 1.1 mils or at least about 1.2 mils or at least about 1.3 mils or at least about 1.4 mils or even at least about 1.5 mils. According to still other embodiments, the adhesive layer 330 may have a thickness of not greater than about 3 mils, such as, not greater than about 2.9 mils or not greater than about 2.8 mils or not greater than about 2.7 mils or not greater than about 2.6 mils or not greater than about 2.5 mils or not greater than about 2.4 mils or not greater than about 2.3 mils or not greater than about 2.2 mils or not greater than about 2.1 mils or even not greater than about 2.0 mils. It will be appreciated that the adhesive layer 230 may have a thickness within a range between any of minimum and maximum values noted above. It will be further appreciated that the adhesive layer 330 may have a thickness of any value between any of the minimum and maximum values noted above.

Figure 4:
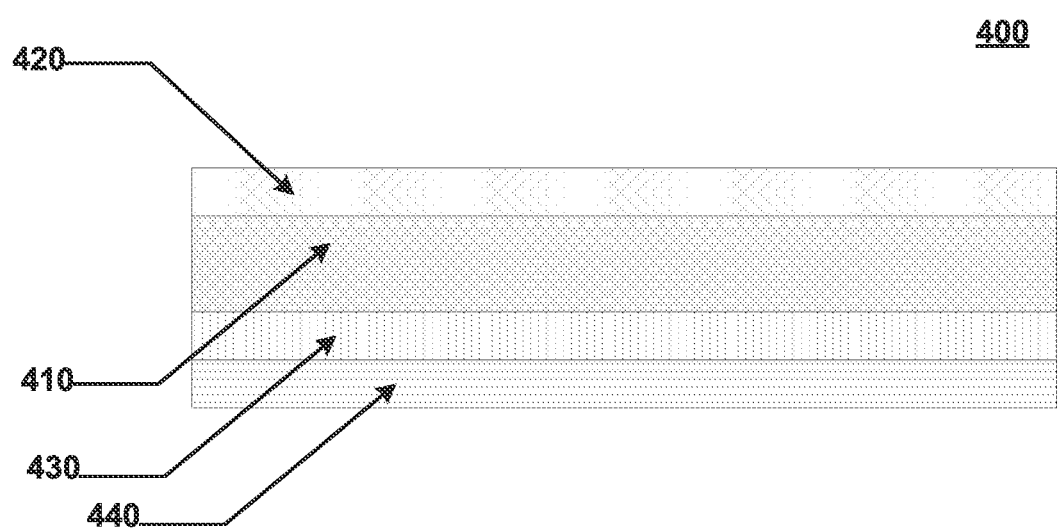
FIG. 4 includes an illustration showing the configuration of a composite film formed according to embodiments described herein.

FIG. 4 includes an illustration of a cross-sectional view of a portion of another example composite film 400. As shown in FIG. 4, the composite film 400 may include a substrate 410, a protection coating 420 overlying a first surface 412 of the substrate 410, an adhesive layer 430 underlying a second surface 414 of the substrate 410, and a liner 440 the adhesive layer 430.

It will be appreciated that all description, details and characteristics provided herein in reference to composite film 200 (300) may further apply to or describe corresponding aspects of composite film 400. Specifically, all description, details, and characteristics provided herein in reference to substrate 210(310), protection coating 220(320) and adhesive layer 330 may further apply to or describe corresponding aspects of substrate 410, protection coating 420, and adhesive layer 430.

According to particular embodiments, the liner 440 may include a particular material. For example, the liner 440 may include a silicone-coated PET layer. According to still other embodiments, the liner 440 may be a silicone-coated PET liner.

According to still other embodiments, the liner 440 may have a particular thickness as measured using a hand micrometer. For example, the liner 440 may have a thickness of at least about 0.5 mils, such as, at least about 0.6 mils or at least about 0.7 mils or at least about 0.8 mils or at least about 0.9 mils or at least about 1.0 mils or at least about 1.1 mils or at least about 1.2 mils or at least about 1.3 mils or at least about 1.4 mils or even at least about 1.5 mils. According to still other embodiments, the liner 340 may have a thickness of not greater than about 3 mils, such as, not greater than about 2.9 mils or not greater than about 2.8 mils or not greater than about 2.7 mils or not greater than about 2.6 mils or not greater than about 2.5 mils or not greater than about 2.4 mils or not greater than about 2.3 mils or not greater than about 2.2 mils or not greater than about 2.1 mils or even not greater than about 2.0 mils. It will be appreciated that the liner 340 may have a thickness within a range between any of minimum and maximum values noted above. It will be further appreciated that the liner 340 may have a thickness of any value between any of the minimum and maximum values noted above.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1. A composite film comprising: a substrate, and a protection coating overlying the substrate, wherein the protection coating comprises: a urethane acrylate 6-functional oligomer, and a urethane acrylate 2-functional oligomer, wherein the protection coating comprises a urethane acrylate oligomer ratio $UAC_6/UAC_2$ of at least about 0.5 and not greater than about 3, where $UAC_6$ is equal to the content of the urethane acrylate 6-functional oligomer in wt. % for a total weight of the protection coating and $UAC_2$ is equal to the content of the urethane acrylate 2-functional oligomer in wt. % for a total dry weight of the protection coating.

Embodiment 2. A composite film comprising: a substrate, and a protection coating overlying a first surface of the substrate, wherein the protection coating comprises: a urethane acrylate 6-functional oligomer at a content of at least about 10 wt. % and not greater than about 75 wt. % for a total dry-weight of the protection coating, and a urethane acrylate 2-functional oligomer at a content of at least about 5 wt. % and not greater than about 50 wt. % for a total dry-weight of the protection coating.

Embodiment 3. A composite film comprising: a substrate, and a protection coating overlying a first surface of the substrate, wherein the protection coating comprises: a urethane acrylate 6-functional oligomer, and a urethane acrylate 2-functional oligomer, wherein the protection coating has a surface energy of at least about 20 mN/m and not greater than about 50 mN/m.

Embodiment 4. A composite film comprising: a substrate, and a protection coating overlying a first surface of the substrate, wherein the protection coating comprises: a urethane acrylate 6-functional oligomer, and a urethane acrylate 2-functional oligomer, wherein the protection coating has a $H_2O$ contact angle of at least about 80° and not greater than about 105°.

Embodiment 5. The composite film of any one of embodiments 2, 3, and 4, wherein the protection coating comprises a urethane acrylate oligomer ratio $UAC_6/UAC_2$ of at last about 0.5 and not greater than about 3, where $UAC_6$ is equal to the content of the urethane acrylate 6-functional oligomer in wt. % for a total weight of the protection coating and $UAC_2$ is equal to the content of the urethane acrylate 2-functional oligomer in wt. % for a total dry weight of the protection coating.

Embodiment 6. The composite film of any one of embodiments 1, 2, and 4, wherein the protection coating has a surface energy of at least about 20 mN/m and not greater than about 50 mN/m.

Embodiment 7. The composite film of any one of embodiments 1, 2, and 3, wherein the protection coating has a $H_2O$ contact angle of at least about 80° and not greater than about 105°.

Embodiment 8. The composite film of any one of embodiments 1, 2, 3, and 4, wherein the protection coating has an elongation of at least about 20%.

Embodiment 9. The composite film of any one of embodiments 1, 2, 3, and 4, wherein the protection coating has an elongation of not greater than about 800%.

Embodiment 10. The composite film of any one of embodiments 1, 2, 3, and 4, wherein the protection coating has a stain resistance rating of not greater than about 3, where the stain resistance rating is equal to the ΔL* color measurement of the coating taken before and after a sharpie mark is made over the length of the film, allowed to sit for 15 seconds, and then wiped off with an IPA wetted rag.

Embodiment 11. The composite film of any one of embodiments 1, 2, 3, and 4, wherein the protection coating has a self-healing rating of at least about 50%.

Embodiment 12. The composite film of any one of embodiments 1, 2, 3, and 4, wherein the protection coating comprises a urethane acrylate 6-functional oligomer at a content of at least about 10 wt. % for a total dry-weight of the protection coating.

Embodiment 13. The composite film of any one of embodiments 1, 2, 3, and 4, wherein the protection coating comprises a urethane acrylate 6-functional oligomer at a content of not greater than about 75 wt. % for a total dry-weight of the protection coating.

Embodiment 14. The composite film of any one of embodiments 1, 2, 3, and 4, wherein the protection coating comprises a urethane acrylate 2-functional oligomer at a content of at least about 5 wt. % for a total dry-weight of the protection coating.

Embodiment 15. The composite film of any one of embodiments 1, 2, 3, and 4, wherein the protection coating comprises a urethane acrylate 2-functional oligomer at a content of not greater than about 50 wt. % for a total dry-weight of the protection coating.

Embodiment 16. The composite film of any one of embodiments 1, 2, 3, and 4, wherein the protection coating further comprises a slip additive.

Embodiment 17. The composite film of embodiment 16, wherein the slip additive comprises at least one of a fluoro based additive, a silicone based additive, a fluoro urethane acrylate, silicone urethane acrylate.

Embodiment 18. The composite film of embodiment 16, wherein the protection coating comprises a slip additive content of at least about 1.0 wt. % for a total dry-weight of the protection coating.

Embodiment 19. The composite film of embodiment 16, wherein the protection coating comprises a slip additive content of not greater than about 7.5 wt. % for a total dry-weight of the protection coating.

Embodiment 20. The composite film of any one of embodiments 1, 2, 3, and 4, wherein the protection coating further comprises a photoinitiator.

Embodiment 21. The composite film of embodiment 16, wherein the photoinitiator comprises at least one of a Norish Type 1 photoinitiator.

Embodiment 22. The composite film of embodiment 16, wherein the protection coating comprises a photoinitiator content of at least about 1 wt. % for a total dry-weight of the protection coating.

Embodiment 23. The composite film of embodiment 16, wherein the protection coating comprises a photoinitiator content of not greater than about 7.5 wt. % for a total dry-weight of the protection coating.

Embodiment 24. The composite film of any one of embodiments 1, 2, 3, and 4, wherein the protection coating comprises a thickness of at least about 1 μm.

Embodiment 25. The composite film of any one of embodiments 1, 2, 3, and 4, wherein the protection coating comprises a thickness of not greater than about 40 μm.

Embodiment 26. The composite film of any one of embodiments 1, 2, 3, and 4, wherein the protection coating comprises a VLT of at least about 90%.

Embodiment 27. The composite film of any one of embodiments 1, 2, 3, and 4, wherein the substrate comprises a thermoplastic polyurethane, a polyurethane substrate, a polyester substrate, a polypropylene substrate, a polyimide substrate, a nylon substrate, a fluoropolymer substrate, a PEN substrate, a PEI substrate, a PEEK substrate, a PPS substrate.

Embodiment 28. The composite film of any one of embodiments 1, 2, 3, and 4, wherein the substrate comprises a thickness of at least about 0.5 mils.

Embodiment 29. The composite film of any one of embodiments 1, 2, 3, and 4, wherein the substrate comprises a thickness of not greater than about 10 mils.

Embodiment 30. The composite film of any one of embodiments 1, 2, 3, and 4, wherein the composite film further comprises an adhesive layer underlying the substrate.

Embodiment 31. The composite film of embodiment 30, wherein the adhesive layer comprises an acrylic adhesive.

Embodiment 32. The composite film of embodiment 30, wherein the adhesive layer comprises a thickness of at least about 0.5 mils.

Embodiment 33. The composite film of embodiment 30, wherein the adhesive layer comprises a thickness of not greater than about 3 mils.

Embodiment 34. The composite film of embodiment 30, wherein the composite film further comprises a liner underlying the adhesive layer.

Embodiment 35. The composite film of embodiment 34, wherein the liner comprises a silicone-coated PET layer.

Embodiment 36. The composite film of embodiment 34, wherein the liner comprises a thickness of at least about 1 mil.

Embodiment 37. The composite film of embodiment 34, wherein the adhesive layer comprises a thickness of not greater than about 5 mils.

Embodiment 38. A method of forming a composite film, wherein the method comprises: providing a substrate, providing wet coating mixture comprising: a urethane acrylate 6-functional oligomer, a urethane acrylate 2-functional oligomer, and a solvent, coating the substrate with the wet coating mixture, and treating the coating mixture to form a protection coating overlying the substrate, wherein the protection coating comprises a urethane acrylate oligomer ratio $UAC_6/UAC_2$ of at last about 0.5 and not greater than about 3, where $UAC_6$ is equal to the content of the urethane acrylate 6-functional oligomer in wt. % for a total weight of the protection coating and $UAC_2$ is equal to the content of the urethane acrylate 2-functional oligomer in wt. % for a total dry weight of the protection coating.

Embodiment 39. A method of forming a composite film, wherein the method comprises: providing a substrate, providing wet coating mixture comprising: a urethane acrylate 6-functional oligomer at a content of at least about 10 wt. % and not greater than about 75 wt. % for a total wet-weight of the wet coating mixture, a urethane acrylate 2-functional oligomer at a content of at least about 5 wt. % and not greater than about 50 wt. % for a total wet-weight of the wet coating mixture, and a solvent, coating the substrate with the wet coating mixture, and treating the coating mixture to form a protection coating overlying the substrate.

Embodiment 40. A method of forming a composite film, wherein the method comprises: providing a substrate, providing wet coating mixture comprising: a urethane acrylate 6-functional oligomer, a urethane acrylate 2-functional oligomer, and a solvent, coating the substrate with the wet coating mixture, and treating the coating mixture to form a protection coating overlying the substrate, wherein the protection coating has a surface energy of at least about 20 and not greater than about 50 mN/m.

Embodiment 41. A method of forming a composite film, wherein the method comprises: providing a substrate, providing wet coating mixture comprising: a urethane acrylate 6-functional oligomer, a urethane acrylate 2-functional oligomer, and a solvent, coating the substrate with the wet coating mixture, and treating the coating mixture to form a protection coating overlying the substrate, wherein the protection coating has a $H_2O$ contact angle of at least about 80° and not greater than about 105°.

Embodiment 42. The method of any one of embodiments 38, 39, 40, and 41, wherein the wet coating mixture comprises a urethane acrylate 6-functional oligomer at a content of at least about 1 wt. % for a total wet-weight of the coating mixture.

Embodiment 43. The method of any one of embodiments 38, 39, 40, and 41, wherein the wet coating mixture comprises a urethane acrylate 6-functional oligomer at a content of not greater than about 77 wt. % for a total wet-weight of the coating mixture.

Embodiment 44. The method of any one of embodiments 38, 39, 40, and 41, wherein the wet coating mixture comprises a urethane acrylate 2-functional oligomer at a content of at least about 0.5 wt. % for a total wet-weight of the coating mixture.

Embodiment 45. The method of any one of embodiments 38, 39, 40, and 41, wherein the wet coating mixture comprises a urethane acrylate 2-functional oligomer at a content of not greater than about 44.5 wt. % for a total wet-weight of the coating mixture.

Embodiment 46. The method of any one of embodiments 38, 39, 40, and 41, wherein the wet coating mixture further comprises a slip additive.

Embodiment 47. The method of embodiment 46, wherein the slip additive comprises at least one of a fluoro based additive, a silicone based additive, a fluoro urethane acrylate, silicone urethane acrylate.

Embodiment 48. The method of embodiment 46, wherein the wet coating mixture comprises a slip additive content of at least about 0.1 wt. % for a total wet-weight of the wet coating mixture.

Embodiment 49. The method of embodiment 46, wherein the wet coating mixture comprises a slip additive content of not greater than about 6.75 wt. % for a total wet-weight of the wet coating mixture.

Embodiment 50. The method of any one of embodiments 38, 39, 40, and 41, wherein the wet coating mixture further comprises a photoinitiator.

Embodiment 51. The method of embodiment 50, wherein the photoinitiator comprises at least one of a Norish Type 1 photoinitiator.

Embodiment 52. The method of embodiment 50, wherein the wet coating mixture comprises a photoinitiator content of at least about 0.1 wt. % for a total wet-weight of the wet coating mixture.

Embodiment 53. The method of embodiment 50, wherein the wet coating mixture comprises a photoinitiator content of not greater than about 6.75 wt. % for a total wet-weight of the wet coating mixture.

Embodiment 54. The method of any one of embodiments 38, 39, 40, and 41, wherein the wet coating mixture further comprises a first solvent.

Embodiment 55. The method of embodiment 54, wherein the first solvent comprises at least one of MEK, MIBK, IPA, Heptane, Ethyl Acetate, Butyl Acetate, Toluene.

Embodiment 56. The method of embodiment 54, wherein the wet coating mixture comprises a first solvent content of at least about 10 wt. % for a total wet-weight of the wet coating mixture.

Embodiment 57. The method of embodiment 54, wherein the wet coating mixture comprises a first solvent content of not greater than about 90 wt. % for a total wet-weight of the wet coating mixture.

Embodiment 58. The method of any one of embodiments 38, 39, 40, and 41, wherein the wet coating mixture further comprises a first solvent.

Embodiment 59. The method of embodiment 58, wherein the second solvent comprises at least one of MIBK, MIBK, IPA, Heptane, Ethyl Acetate, Butyl Acetate, Toluene.

Embodiment 60. The method of embodiment 58, wherein the wet coating mixture comprises a second solvent content of at least about 10 wt. % for a total wet-weight of the wet coating mixture.

Embodiment 61. The method of embodiment 58, wherein the wet coating mixture comprises a second solvent content of not greater than about 90 wt. % for a total wet-weight of the wet coating mixture.

Embodiment 62. The method of any one of embodiments 38, 39, 40, and 41, wherein the protection coating comprises a urethane acrylate oligomer ratio $UAC_6/UAC_2$ of at last about 0.5 and not greater than about 3, where $UAC_6$ is equal to the content of the urethane acrylate 6-functional oligomer in wt. % for a total weight of the protection coating and $UAC_2$ is equal to the content of the urethane acrylate 2-functional oligomer in wt. % for a total dry weight of the protection coating.

Embodiment 63. The method of any one of embodiments 38, 39, 40, and 41, wherein the protection coating has a surface energy of at least about 20 and not greater than about 50.

Embodiment 64. The method of any one of embodiments 38, 39, 40, and 41, wherein the protection coating has a $H_2O$ contact angle of at least about 80° and not greater than about 105°.

Embodiment 65. The method of any one of embodiments 38, 39, 40, and 41, wherein the protection coating has an elongation of at least about 20%.

Embodiment 66. The method of any one of embodiments 38, 39, 40, and 41, wherein the protection coating has an elongation of not greater than about 800%.

Embodiment 67. The method of any one of embodiments 38, 39, 40, and 41, wherein the protection coating has a stain resistance rating of not greater than about 3, where the stain resistance rating is equal to the $\Delta L^*$ color measurement of the coating taken before and after a sharpie mark is made over the length of the film, allowed to sit for 15 seconds, and then wiped off with an IPA wetted rag.

Embodiment 68. The method of any one of embodiments 38, 39, 40, and 41, wherein the protection coating has a self-healing rating of at least about 50%.

Embodiment 69. The method of any one of embodiments 38, 39, 40, and 41, wherein the protection coating comprises a urethane acrylate 6-functional oligomer at a content of at least about 10 wt. % for a total dry-weight of the protection coating.

Embodiment 70. The method of any one of embodiments 38, 39, 40, and 41, wherein the protection coating comprises a urethane acrylate 6-functional oligomer at a content of not greater than about 75 wt. % for a total dry-weight of the protection coating.

Embodiment 71. The method of any one of embodiments 38, 39, 40, and 41, wherein the protection coating comprises a urethane acrylate 2-functional oligomer at a content of at least about 5 wt. % for a total dry-weight of the protection coating.

Embodiment 72. The method of any one of embodiments 38, 39, 40, and 41, wherein the protection coating comprises a urethane acrylate 2-functional oligomer at a content of not greater than about 50 wt. % for a total dry-weight of the protection coating.

Embodiment 73. The method of any one of embodiments 38, 39, 40, and 41, wherein the protection coating further comprises a slip additive.

Embodiment 74. The method of embodiment 73, wherein the slip additive comprises at least one of a fluoro based additive, a silicone based additive, a fluoro urethane acrylate, silicone urethane acrylate.

Embodiment 75. The method of embodiment 73, wherein the protection coating comprises a slip additive content of at least about 1.0 wt. % for a total dry-weight of the protection coating.

Embodiment 76. The method of embodiment 73, wherein the protection coating comprises a slip additive content of not greater than about 7.5 wt. % for a total dry-weight of the protection coating.

Embodiment 77. The method of any one of embodiments 38, 39, 40, and 41, wherein the protection coating further comprises a photoinitiator.

Embodiment 78. The method of embodiment 77, wherein the photoinitiator comprises at least one of a Norish Type 1 photoinitiator.

Embodiment 79. The method of embodiment 77, wherein the protection coating comprises a photoinitiator content of at least about 1.0 wt. % for a total dry-weight of the protection coating.

Embodiment 80. The method of embodiment 77, wherein the protection coating comprises a photoinitiator content of not greater than about 7.5 wt. % for a total dry-weight of the protection coating.

Embodiment 81. The method of any one of embodiments 38, 39, 40, and 41, wherein the protection coating comprises a thickness of at least about 1 µm.

Embodiment 82. The method of any one of embodiments 38, 39, 40, and 41, wherein the protection coating comprises a thickness of not greater than about 40 µm.

Embodiment 83. The method of any one of embodiments 38, 39, 40, and 41, wherein the protection coating comprises a VLT of at least about 90%.

Embodiment 84. The method of any one of embodiments 38, 39, 40, and 41, wherein the substrate comprises a thermoplastic polyurethane, a polyurethane substrate, a polyester substrate, a polypropylene substrate, a polyimide substrate, a nylon substrate, a fluoropolymer substrate, a PEN substrate, a PEI substrate, a PEEK substrate, a PPS substrate.

Embodiment 85. The method of any one of embodiments 38, 39, 40, and 41, wherein the substrate comprises a thickness of at least about 0.5 mils.

Embodiment 86. The method of any one of embodiments 38, 39, 40, and 41, wherein the substrate comprises a thickness of not greater than about 10 mils.

Embodiment 87. The method of any one of embodiments 38, 39, 40, and 41, wherein the method further comprises forming an adhesive layer underlying the substrate.

Embodiment 88. The method of embodiment 87, wherein the adhesive layer comprises an acrylic adhesive.

Embodiment 89. The method of embodiment 87, wherein the adhesive layer comprises a thickness of at least about 0.5 mils.

Embodiment 90. The method of embodiment 87, wherein the adhesive layer comprises a thickness of not greater than about 3 mils.

Embodiment 91. The method of embodiment 87, wherein the method further comprises forming a liner underlying the adhesive layer.

Embodiment 92. The method of embodiment 91, wherein the liner comprises a silicone-coated PET layer.

Embodiment 93. The method of embodiment 91, wherein the liner comprises a thickness of at least about 1 mil.

Embodiment 94. The method of embodiment 91, wherein the adhesive layer comprises a thickness of not greater than about 5 mils.

EXAMPLES

The concepts described herein will be further described in the following Examples, which do not limit the scope of the invention described in the claims.

Example 1

A sample composite film S1 was formed with a protective coating according to embodiments described herein. The formulation of the protective coating is summarized in Table 1 below.

TABLE 1

Protective Coating Composition

| Component Name | % Solids | Wt % In Formulation | Wt % In Cured Film |
|---|---|---|---|
| MEK (solvent) | 0.0% | 30.00% | 0.00% |
| MIBK (solvent) | 0.0% | 30.00% | 0.00% |
| 6-functional urethane acrylate | 100.0% | 19.65% | 49.13% |
| 2-functional urethane acrylate | 100.0% | 15.42% | 38.55% |
| Fluoro urethane acrylate | 100.0% | 2.00% | 5.00% |
| Photoinitiator | 100.0% | 1.66% | 4.15% |
| UV absorber | 100.0% | 0.85% | 2.13% |
| Hindered amine | 100.0% | 0.42% | 1.05% |

In order to form the protective coating for sample S1, the materials are weighed and added to a 100 mL glass jar. Once all components are in the jar, the lid is sealed with tape and placed on a roller mixer over night to ensure full mixing.

Handsheets of the coated sample S1 used for testing were coated via Mayer rod. The mayer rod number chosen is based on the target dry thickness of the film and the solids % of the formulation.

A4 size handsheets were used for the Mayer rod drawdowns. The drawdown was conducted in a ventilated hood on a flat coating stage at room temperature.

Following coating, the film is carefully removed from the coating stage and transferred and taped onto a PET web on our roll-to-roll horizontal pilot coating line. The line is then set at 10 ft/min and the sample runs through the ovens and UV conveyer for drying and curing. The 8 ft convection oven is set at 150 F. The UV chamber is set at 70% intensity providing a UV cure energy of ~800 mJ/cm$^2$. Nitrogen purging is used during curing and the O$_2$ level in the UV conveyer is sub 50 ppm. The film is fully cured after this procedure. The UV chamber is a Heraeus Noblelight system that consists of one 10" H bulb.

Example 2

Sample composite films S2-S7 were formed with a protective coating according to embodiments described herein. The formulation of the protective coatings are summarized in Table 2 below.

TABLE 2

Protective Coating Compositions

Wt % In Formulation

| Sample No. | MEK (solvent) | MIBK (solvent) | Fluoro urethane acrylate | Photo-initiator | UV absorber | Amine | 6-func. UA | 2-func. UA | UA Ratio 6-Func/2-Func |
|---|---|---|---|---|---|---|---|---|---|
| S2 | 30.00 | 30.00 | 2.00 | 1.66 | 0.85 | 0.42 | 11.35 | 11.35 | 1 |
| S3 | 30.00 | 30.00 | 2.00 | 1.66 | 0.85 | 0.42 | 13.95 | 8.58 | 1.6 |
| S4 | 30.00 | 30.00 | 2.00 | 1.66 | 0.85 | 0.42 | 32.9 | 37.1 | 0.9 |
| S5 | 30.00 | 30.00 | 2.00 | 1.66 | 0.85 | 0.42 | 11.76 | 11.76 | 1 |
| S6 | 30.00 | 30.00 | 2.00 | 1.66 | 0.85 | 0.42 | 16 | 10 | 1.6 |
| S7 | 30.00 | 30.00 | 2.00 | 1.66 | 0.85 | 0.42 | 50.4 | 19.6 | 2.6 |

In order to form the protective coating for samples S2-S7, the materials are weighed and added to a 100 mL glass jar. Once all components are in the jar, the lid is sealed with tape and placed on a roller mixer over night to ensure full mixing.

Handsheets of the coated samples S2-S7 used for testing were coated via Mayer rod. The mayer rod number chosen is based on the target dry thickness of the film and the solids % of the formulation.

A4 size handsheets were used for the Mayer rod drawdowns. The drawdown was conducted in a ventilated hood on a flat coating stage at room temperature.

Following coating, the film was carefully removed from the coating stage and transferred and taped onto a PET web on our roll-to-roll horizontal pilot coating line. The line is then set at 10 ft/min and the sample runs through the ovens and UV conveyer for drying and curing. The 8 ft convection oven is set at 150 F. The UV chamber is set at 70% intensity providing a UV cure energy of ~800 mJ/cm$^2$. Nitrogen purging is used during curing and the O$_2$ level in the UV conveyer is sub 50 ppm. The film is fully cured after this procedure. The UV chamber is a Heraeus Noblelight system that consists of one 10" H bulb.

Each sample S2-S7 were tested to determine performance of the coating in IPA Stain Resistance, Elongation, Self-Healing, Surface Energy, and Contact Angle.

IPA Stain Resistance was tested by mounting the sample to a white paint panel using soap and water. The color (L*) of the film is taken using a Byk Color Meter and recorded. A king size black sharpie is used to mark up the film and the sample is left for 15 seconds. For the dry wipe, following the 15 seconds, a dry towel is used to wipe off the sharpie mark. For the wet wipe, following the 15 seconds, an IPA wetted towel is used wiped over the surface three times to remove the sharpie mark. The Byk Meter is then used to measure the color (L*) of the film in the marked area following the test. The change in L* before and after the sharpie mark is calculated and recorded. A value of ΔL* of zero is optimal, meaning that all of the sharpie mark was removed. A high value of ΔL* means there is a lot of the sharpie mark leftover creating a stained film.

Elongation was tested through an instron tensile test. A 1"×6" sample is cut and mounted into clamps in the instron with a 2" jaw separation. The instron is set to move at 100 mm/min with a 5 kN load cell. A dinoscope is mounted to the instron to provide a light source and record the test in real time. The elongation percent (%) is recorded at the first sign of cracking on the video. Typically, the test is allowed to continue well past the initial cracking onsite and the video is rewound to more accurately pinpoint cracking onset.

Self-Healing was tested by mounting the film to a white paint panel with soap and water. An image is taken of the film initially, after scratching, and after healing using a dinoscope. The self-healing performance is a qualitative and quantitative determination based on the before and after images to see how many scratches were healed following the test. The film is scratched via a controlled motorized sled. The pressure of the coarse steel brush against the sample is controlled via a spring loaded system; a 3.2 lb weight is placed in the bin to maintain a constant pressure. The sled is set to move at 100 mm/s and the scratching is performed twice against the sample in the same direction. After the scratched image is taken, hot water is immediately poured onto the sample, wiped off, and the sample is imaged again. The initial, before, and after images can then be processed using a Python script to count the number of scratches before and after healing to provide a % healed measurement for each sample. The script first identified an area of view on the image that avoids the ring of lights and then identifies the scratches by finding light patterns associated with the scratches.

Surface Energy and Contact Angle are both measured using a Kruss Mobile Surface Analyzer which deposits and images a droplet of both water and diiodomethane on the surface of the film and measures the contact angle of each. Based on these measurements, the surface energy is calculated according to Owens-Wendt-Rabel-Kaelble, Wu, Zisman, Fowkes and van Oss & Good.

Performance results for sample composite films S2-S7 are summarized in Table 3 below.

TABLE 3

Performance Results

| Sample No. | IPA Stain Resistance (ΔL*) | | Elongation (%) | | Self-Healing (%) | | Surface Energy (mN/m) | | Contact Angle (deg) | |
|---|---|---|---|---|---|---|---|---|---|---|
| | With Slip | Without Slip | With Slip | Without Slip | With Slip | Without Slip | With Slip | Without Slip | With Slip | Without Slip |
| S2 | 0.2 | — | 101 | — | 80 | — | 23.2 | — | 101.7 | — |
| S3 | 0.1 | — | 75 | — | 80 | — | 24.2 | — | 96.7 | — |
| S4 | — | 1.4 | — | 118 | — | 80 | — | 43.7 | — | 83.8 |
| S5 | — | 1.4 | — | 133 | — | 80 | — | 42.4 | — | 84.6 |
| S6 | — | 1.5 | — | 84 | — | 70 | — | 42.6 | — | — |
| S7 | — | 0.6 | — | 75 | — | 60 | — | 43.9 | — | 84.5 |

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A composite film comprising:
   a substrate, and
   a protection coating overlying the substrate, wherein the protection coating comprises:
      a photoinitiator,
      a urethane acrylate 6-functional oligomer, and
      a urethane acrylate 2-functional oligomer,
         wherein the protection coating comprises a urethane acrylate oligomer ratio $UAC_6/UAC_2$ of at least about 0.5 and not greater than about 3, where $UAC_6$ is equal to the content of the urethane acrylate 6-functional oligomer in wt. % for a total weight of the protection coating and $UAC_2$ is equal to the content of the urethane acrylate 2-functional oligomer in wt. % for a total dry weight of the protection coating.

2. The composite film of claim 1, wherein the protection coating has a $H_2O$ contact angle of at least about 80° and not greater than about 105°.

3. The composite film of claim 1, wherein the protection coating has an elongation of at least about 20% and not greater than about 800%.

4. The composite film of claim 1, wherein the protection coating has a stain resistance rating of not greater than about 3, where the stain resistance rating is equal to the ΔL* color measurement of the coating taken before and after a sharpie mark is made over the length of the film, allowed to sit for 15 seconds, and then wiped off with an IPA wetted rag.

5. The composite film of claim 1, wherein the protection coating has a self-healing rating of at least about 50%.

6. The composite film of claim 1, wherein the protection coating comprises a urethane acrylate 6-functional oligomer at a content of at least about 10 wt. % and not greater than about 75 wt. % for a total dry-weight of the protection coating.

7. The composite film of claim 1, wherein the protection coating comprises a urethane acrylate 2-functional oligomer at a content of at least about 5 wt. % and not greater than about 50 wt. % for a total dry-weight of the protection coating.

8. The composite film of claim 1, wherein the protection coating further comprises a slip additive.

9. The composite film of claim 8, wherein the slip additive comprises at least one of a fluoro based additive, a silicone based additive, a fluoro urethane acrylate, or silicone urethane acrylate.

10. The composite film of claim 8, wherein the protection coating comprises a slip additive content of at least about 1.0 wt. % and not greater than about 7.5 wt. % for a total dry-weight of the protection coating.

11. The composite film of 1, wherein the protection coating comprises a photoinitiator content of at least about 1 wt. % and not greater than about 7.5 wt. % for a total dry-weight of the protection coating.

12. The composite film of claim 1, wherein the protection coating comprises a thickness of at least about 1 μm and not greater than about 40 μm.

13. A composite film comprising:
   a substrate, and
   a protection coating overlying a first surface of the substrate, wherein the protection coating comprises:
      a photoinitiator,
      a urethane acrylate 6-functional oligomer at a content of at least about 10 wt. % and not greater than about 75 wt. % for a total dry-weight of the protection coating, and
      a urethane acrylate 2-functional oligomer at a content of at least about 5 wt. % and not greater than about 50 wt. % for a total dry-weight of the protection coating.

14. The composite film of claim 13, wherein the protection coating further comprises a slip additive.

15. The composite film of claim 14, wherein the slip additive comprises at least one of a fluoro based additive, a silicone based additive, a fluoro urethane acrylate, or silicone urethane acrylate.

16. The composite film of claim 14, wherein the protection coating comprises a slip additive content of at least about 1.0 wt. % and not greater than about 7.5 wt. % for a total dry-weight of the protection coating.

17. The composite film of claim 1, wherein the protection coating comprises a photoinitiator content of at least about 1 wt. % and not greater than about 7.5 wt. % for a total dry-weight of the protection coating.

18. A composite film comprising:
   a substrate, and
   a protection coating overlying a first surface of the substrate, wherein the protection coating comprises:
      a photoinitiator,
      a urethane acrylate 6-functional oligomer, and
      a urethane acrylate 2-functional oligomer,
      wherein the protection coating has a surface energy of at least about 20 mN/m and not greater than about 50 mN/m.

* * * * *